J. G. Hadfield.
Surgical Cup.
No. 75412.  Patented Mar. 10, 1868.
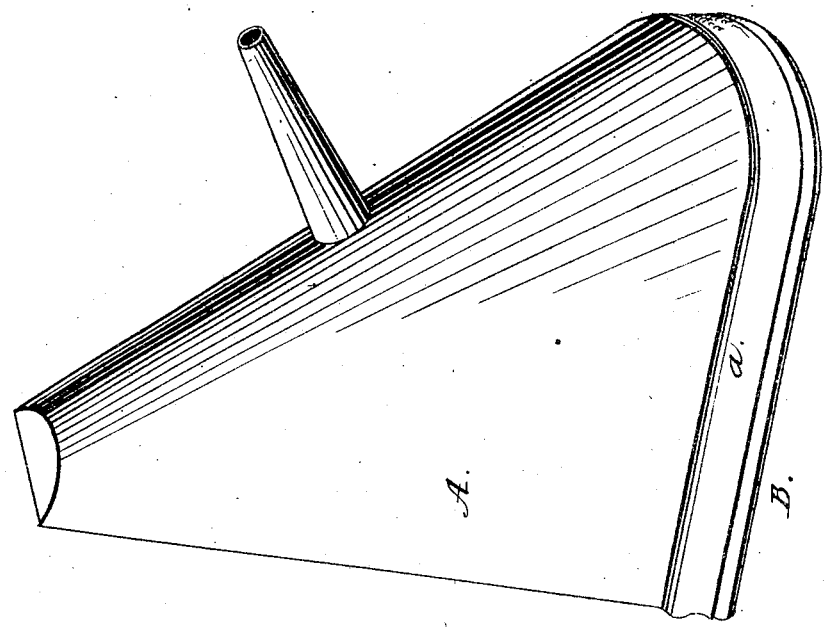
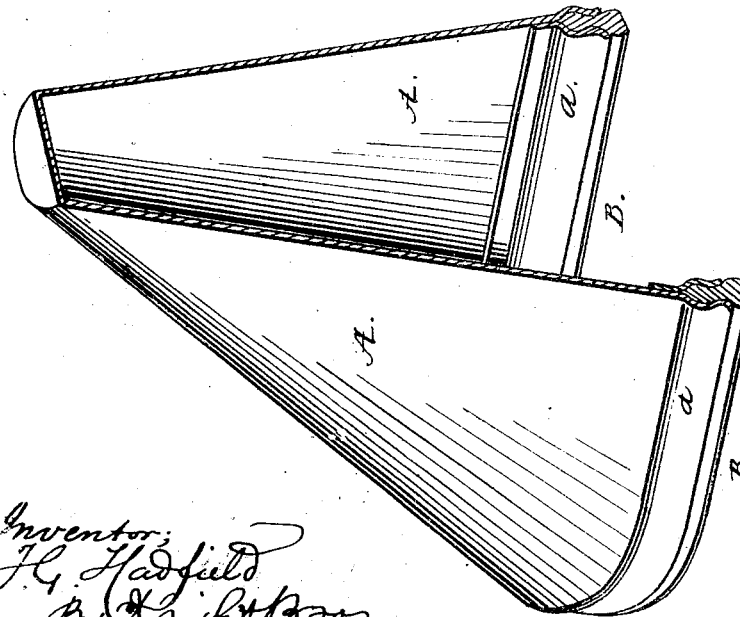
Inventor:
J. G. Hadfield
By Knight Bros
Atty.
Attest:
George Johnson.
James Smith

United States Patent Office.

JOHN G. HADFIELD, OF CINCINNATI, OHIO.

Letters Patent No. 75,412, dated March 10, 1868.

IMPROVEMENT IN SURGICAL CUP.

The Schedule referred to in these Letters Patent and making part of the same.

TO WHOM IT MAY CONCERN:

Be it known that I, JOHN G. HADFIELD, of Cincinnati, Hamilton county, and State of Ohio, have invented a certain new and useful Improvement in Surgical Cups; and do hereby declare the following to be a full, clear, and exact description thereof, reference being had to the accompanying drawings, making part of this specification.

My invention relates to an improved form and mode of attachment of the rubber lip employed at the margin of surgical cups, the same resulting in a great economy of rubber.

In the accompanying drawing, a cup provided with my improved lip is represented by an axially divided perspective view.

The cup A may be of any one of the various forms employed for different parts of the body, and, instead of entering a crease prepared for it in the rubber lip, is itself provided with a groove, $a$, of the represented form, to receive and securely hold a ring, B, of India rubber. The crease being in the margin of the cup instead of in the top of the lip, the latter is enabled to be of much less dimension than would otherwise be possible, with a corresponding saving in expense.

I claim herein as new, and of my invention—

The provision, in a surgical cup, of a groove, $a$, to receive and hold an India-rubber lip, B, in the manner set forth.

In testimony of which invention, I hereunto set my hand.

JOHN G. HADFIELD.

Witnesses:
GEO. H. KNIGHT,
JAMES H. LAYMAN.